United States Patent
Iglehart et al.

[19]

[11] Patent Number: 5,903,626
[45] Date of Patent: May 11, 1999

[54] DIAGNOSTIC DEVICE FOR TROUBLESHOOTING REMOTE DIGITAL FEATURE PHONES

[75] Inventors: David Iglehart; Leland Lester, both of Austin; Elie Antoun Jreij, Pflugerville, all of Tex.; Andrzej Koscinski, Mountain View, Calif.; Graham Howard, Boca Raton, Fla.; William J. Beyda, Cupertino, Calif.

[73] Assignee: Siemens Information and Communication Networks, Inc., Boca Raton, Fla.

[21] Appl. No.: 08/955,881

[22] Filed: Oct. 21, 1997

[51] Int. Cl.[6] .................................................. H04M 1/24
[52] U.S. Cl. ............................................ 379/28; 379/29
[58] Field of Search .................................. 379/1, 5, 6, 27, 379/28, 29, 30, 32; 370/252, 241

[56] References Cited

U.S. PATENT DOCUMENTS

| | | | |
|---|---|---|---|
| 5,150,402 | 9/1992 | Yamada | 379/93.01 |
| 5,208,803 | 5/1993 | Conforti et al. | 370/13 |
| 5,289,472 | 2/1994 | Cho | 370/110.1 |
| 5,412,709 | 5/1995 | Jarvis et al. | 379/28 |
| 5,485,511 | 1/1996 | Iglehart et al. | 379/157 |
| 5,508,941 | 4/1996 | Leplingard et al. | 364/514 B |
| 5,652,782 | 7/1997 | Hughes-Hartogs | 379/27 |

Primary Examiner—Paul Loomis

[57] ABSTRACT

A method, system, and device for performing diagnostic testing of digital feature phones remotely located from a diagnostic device includes establishing a bi-directional communications link between a digital feature phone and the diagnostic device. The diagnostic device transmits signals to the digital feature phone which activate a troubleshooting program in the feature phone to perform a self-test and access an error list stored in the memory of the feature phone. The diagnostic device can direct the feature phone's troubleshooting program to execute different troubleshooting procedures; depending on what information is needed. The feature phone transmits the results of the troubleshooting procedures back to the diagnostic device, whereupon the diagnostic device determines the performance characteristics of the feature phone based upon the troubleshooting results. Based on the performance characteristics, the diagnostic device determines whether more information is required regarding the feature phone's operational status. If more information is required, the diagnostic device can request a second round of troubleshooting. In one embodiment, the diagnostic device and the feature phone are connected via an ISDN network which provides at least two B-channels for data communication and a D-channel for transmitting signaling data. The diagnostic device transmits the request for troubleshooting to the feature phone via a D-channel and the feature phone returns the troubleshooting results via the D-channel as well. The D-channel communication between the diagnostic device and feature phone occurs in the form of message associated UUI (MA-UUI) signals. In this manner, the entire troubleshooting procedure can be executed on a customer's feature phone without interrupting service to the feature phone.

18 Claims, 3 Drawing Sheets

DIAGNOSTIC DEVICE FOR TROUBLESHOOTING REMOTE DIGITAL FEATURE PHONES

BACKGROUND OF THE INVENTION

The invention relates generally to methods and devices for troubleshooting digital feature phones and more particularly to remotely troubleshooting digital features phones on a digital telecommunications network.

DESCRIPTION OF THE RELATED ART

Digital telephones provide features that are typically not available to users of conventional analog telephones. A digital connection equipped for both voice and data communications allows a personal computer user to place a voice call to one person, while simultaneously transferring files to the personal computer of another person. The higher bandwidth available with digital telephones affords users the benefits of advanced features. The network most commonly used to support digital phones is the Integrated Services Digital Network (ISDN). The ISDN includes at least two B-channels carrying user data and a D-channel that primarily carries signaling data. The B-channels have a bandwidth of 64 Kbps and the D-channel has a bandwidth of either 16 or 64 Kbps. Two alternative ISDN services are available to an ISDN user; a Basic Rate interface (BRI), and a Primary Rate Interface (PRI). The BRI, which has two B-channels and a single D-channel, possesses a bandwidth of 144 Kbps, and is sometimes referred to as a 2B+D interface to the ISDN. The PRI consists of either 23 or 30 B-channels for user data and a single 64 Kbps D-channel. The 23B+D interface is used in North America and Japan to provide an effective bandwidth of 1.544 Mbps, while the 30B+D method is used in Europe to provide an effective bandwidth of 2.048 Mbps.

The signaling capabilities of an ISDN are significantly superior to the current public network supporting analog phones. One feature provided by the advanced signaling capabilities is similar to the Private Branch Exchange (PBX) camp-on feature. In response to a busy signal, the user of a digital phone interfaced to an ISDN can instruct the central office to automatically place the call again when the line is free. In addition, signaling data can transmit information to a customer regarding a caller's phone number and the name of the party under whom the number is registered.

The many advantages of a digital phone interfaced to an ISDN are quite evident. However, the sophisticated hardware and software contained in these digital phones, while contributing to these advantages, also make service of the digital phones quite complicated. Currently, if a service provider supporting digital phones needs to troubleshoot a customer's phone, one of two options exist; a technician can travel to the location of the phone to perform the troubleshooting, or the technician can call the customer and have the customer perform troubleshooting procedures while the technician guides the customer through the steps. The first option can be expensive, especially if the customer is located some distance from the service provider. The second option requires disruption of the customer's privacy and is of limited value if the troubleshooting requires performance of sophisticated procedures.

What is needed is a method and apparatus for performing troubleshooting on remotely located digital feature phones which does not interfere with the service on the customer's feature phone and does not require the dispatching of a technician to the location of the feature phone.

SUMMARY OF INVENTION

A method for performing remote diagnostic testing on a digital feature phone supported by a digital communications network includes establishing a link between a diagnostic device and a digital feature phone remotely located from the diagnostic device. The digital feature phone employs a program with a diagnostic protocol to execute troubleshooting functions on the digital feature phone. The diagnostic device transmits signals to the digital feature phone which activate the program and specify particular troubleshooting functions for the program to perform. The signals can activate the digital feature phone when the phone is either in an on-hook or an off-hook state. The digital feature phone then sends signals back to the diagnostic device which contain the results of the troubleshooting. Finally, the performance characteristics of the digital feature phone are determined by the diagnostic device based upon the troubleshooting results relayed from the digital feature phone.

The method can be employed within an ISDN, wherein the signals sent between the diagnostic device and the digital feature phones are message associated user-to-user information (MA-UUI) which is transmitted over the D-channel. The MA-UUI sent out by the diagnostic device to activate the program in the digital feature phone is associated with a SETUP signal for establishing a B-channel connection. The MA-UUI also includes a header that causes the digital feature phone to refuse an associated B-channel call. The digital feature phone transmits a DISCONNECT signal to refuse the B-channel call and the results of the troubleshooting are embedded within the DISCONNECT signal in the form of an MA-UUI.

The troubleshooting operations executed by the digital feature phone include generating an error list which constitutes data of each malfunction of the digital feature phone during its operation, as well as a self-test of the digital feature phone's hardware and software. The diagnostic device can interpret the results of the troubleshooting operations and send out a second MA-UUI, instructing the program in the digital feature phone to execute a second set of troubleshooting operations based on the interpretation of the first set of troubleshooting operations.

DETAILED DESCRIPTION

The best mode of practicing the invention will be described by discussing troubleshooting of digital feature phones remotely located from a diagnostic device. However, it should be noted that the troubleshooting can be performed on other digital terminals, such as personal computers and digital fax machines, without deviating from the invention.

Figure 1:
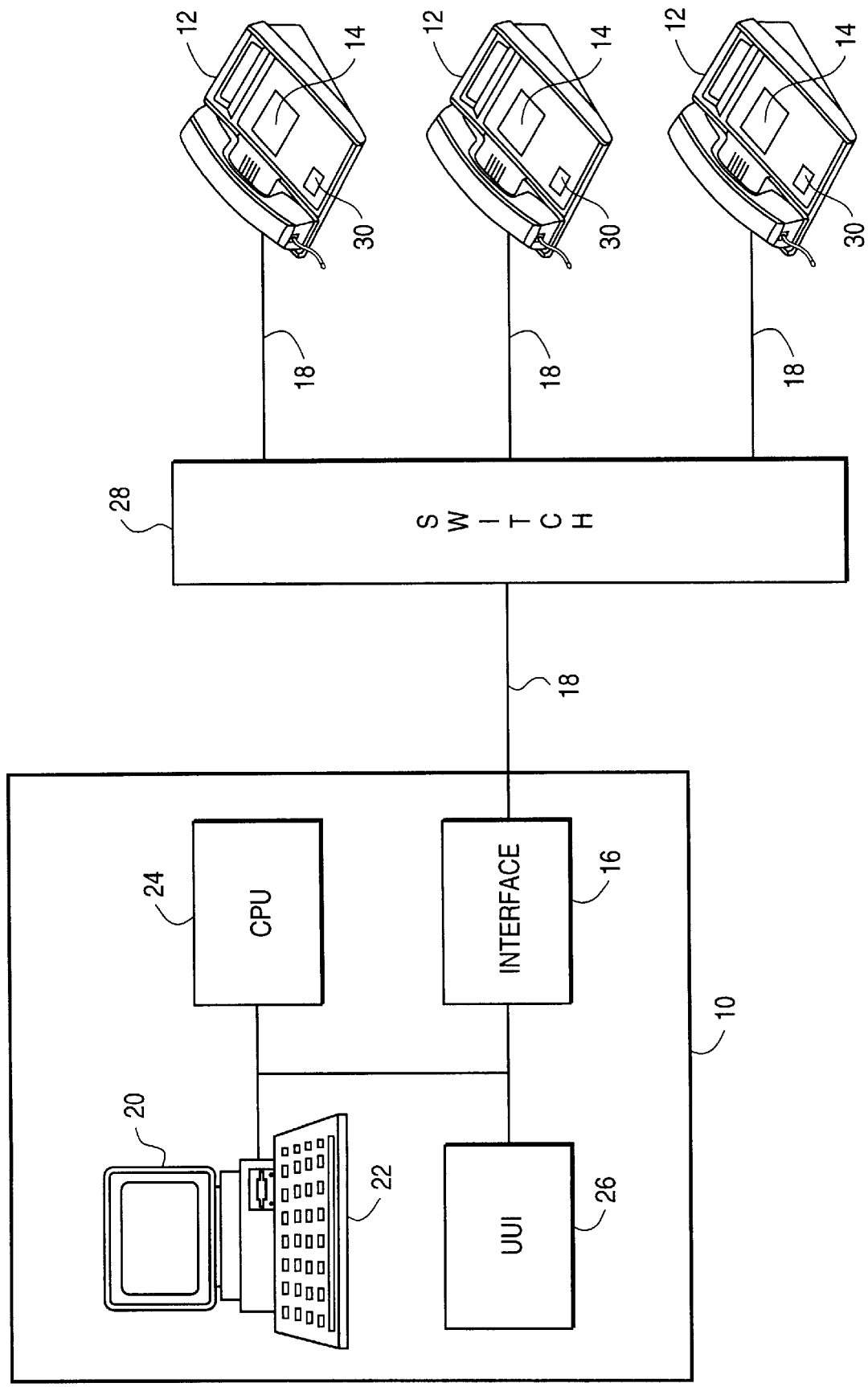
FIG. 1 is a block diagram of a system for performing diagnostic procedures on remotely located ISDN phones.

With reference to FIG. 1, a diagnostic device 10 provides troubleshooting of remotely located ISDN phones 12 without interrupting operation of the phone at the user end. That is, the troubleshooting procedure is preferably transparent to the user. The diagnostic device includes an ISDN interface 16 to connect the diagnostic device to the ISDN lines 18 which run to the digital phones. A service technician preparing to service a particular phone uses the keyboard 22 in connection with the monitor 20 and the central processing unit 24 (CPU) to control a user-to-user information (UUI) program 26 to specify the particular phone to be called and the troubleshooting procedures to be executed. The range of troubleshooting procedures requested depends on the context of the situation. For instance, if a customer has communicated to the telephone company that some feature of the subscriber's service (e.g., caller ID) or some component of the subscriber's phone (e.g., the ringer) is not properly functioning, then a technician might instruct the UUI program 26 to perform a specific set of troubleshooting operations designed to identify the cause of the malfunction. Alternatively, the technician might send out a request for a set of routine troubleshooting operations which is not in response to any subscriber service order, but is simply part of a regularly scheduled service checkup. In this manner, a service malfunction of which a subscriber was not yet aware could be detected. Signals conveying the information requesting troubleshooting are conducted on the ISDN line 18 through an ISDN switch 28.

Although in FIG. 1 an ISDN switch is positioned between the diagnostic device and the digital phones, this configuration is not necessary to the invention. The diagnostic device may be installed at the trunk end of the central office and connected directly to subscriber lines. It is possible to utilize a diagnostic device in a central office and thus avoid routing the signals through an ISDN switch. A local telephone company may be the service provider for digital feature phones. A remote digital device set up at a central office can initiate systematic troubleshooting procedures on a large number of customers' telephones. The service is more economical and more efficient than employing a service technician to travel to customers' phones to execute troubleshooting operations.

Alternatively, the diagnostic device can be employed in a private branch exchange. A corporation which utilizes a large number of digital phones might opt to forego the expense of an outside service provider for their digital phones. The diagnostic device initiates troubleshooting for digital phones at a local facility, as well as any other phones located in any of the corporate facilities worldwide. The results are communicated via MA-UUI to the remote facilities where service technicians can perform the necessary repair procedures.

Another alternative is to locate the remote diagnostic device in a personal computer (not shown). The computer is programmed to cause troubleshooting operations to be performed on specified digital phones. A link is established between the computer and a central processing unit, and the computer is programmed to transmit certain complex troubleshooting results to the CPU for diagnostic interpretation. If necessary, the CPU can then transmit to the computer instructions to request successive rounds of troubleshooting based on the preliminary results of the first round of troubleshooting.

Upon reaching the digital phone 12, the signals activate a troubleshooting program 14 and instruct the program to carry out specified troubleshooting operations. Alternatively, the signals might access troubleshooting data from a memory 30 contained in the phone. The phone might routinely perform troubleshooting operations and then store the results in the memory 30. The results of the troubleshooting operations are then transmitted back to the remote diagnostic device by signals generated from the troubleshooting program, which acts as a downloading means. The entire troubleshooting operation can be conducted without any disruption of the phone service on the user end. As will be explained more fully below, the request for troubleshooting can be transmitted in a D-channel call which causes the subscriber's phone to reject an associated B-channel call. The results of the troubleshooting are contained in the D-channel message which contains the rejection of the B-channel call. Because a subscriber is charged only for a B-channel call, but not a D-channel call, the service provider performing the troubleshooting is not charged for the call.

Figure 2:
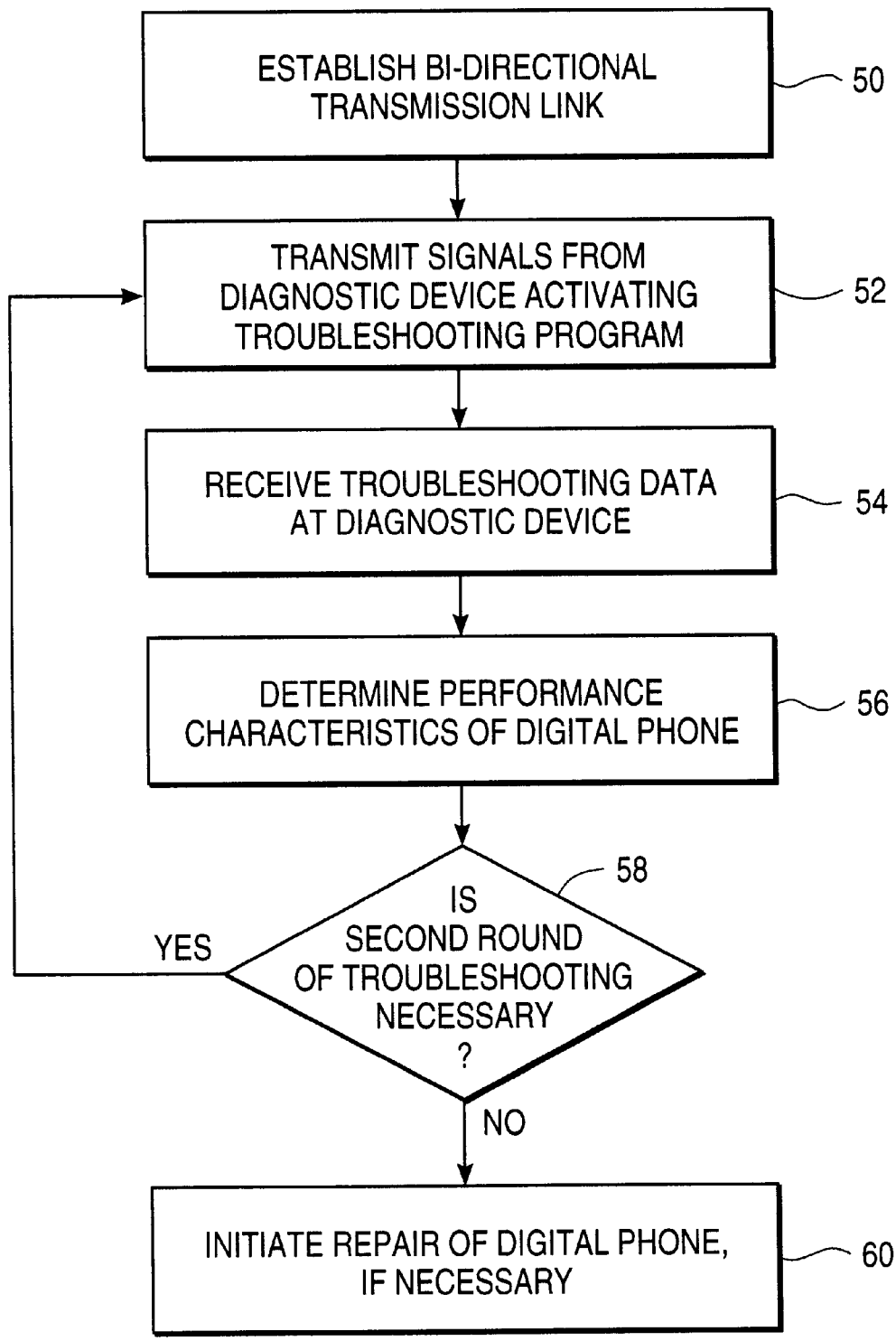
FIG. 2 is a process flow of steps for utilizing the system of FIG. 1.

FIG. 2 illustrates a method for remote diagnostic testing of digital phones utilizing the diagnostic device 10. The CPU 24 of the diagnostic device 10 is utilized to control the UUI program to establish a bi-directional transmission link between the diagnostic device and a remotely located digital phone, as shown in step 50. The UUI program then transmits signals from the diagnostic device, activating and instructing the troubleshooting program to carry out specified troubleshooting operations in the digital phone, as shown in step 52. As discussed above, the specific set of troubleshooting operations can vary from a routine troubleshooting operation to a specialized set of procedures designed to identify the cause of a known problem.

One method in which the troubleshooting program might operate is that it would access a memory which has stored within it results of self-tests as well as error lists. In this embodiment, the telephone is equipped with a troubleshooting program which regularly executes self-tests on hardware and generates error lists and stores the results of both in the memory. The hardware tests would test the functioning of items such as the ringer, any lamps or other displays on the terminal device, the switchhook, the volume settings, the speaker on the handset, a headset, or a loud-speaker. The phone's internal self-testing program could also test the memory for abbreviated calling and the like. The error list is generated by a program which records each error the phone commits during its operation. The error list is coded so that each possible error which the phone might make has a corresponding number. A personal computer, a central processing unit, or a technician would have to decode the error list. The error list information is used together with the self-test results in formulating a diagnosis of the malfunctions of the phone or for formulating a second round of troubleshooting, if necessary. The decision of whether to engage in a second round of troubleshooting could be made either by the central processing unit, a personal computer, or a technician.

Alternatively, the signals sent from the remote diagnostic device in step 52 which activate the troubleshooting program could initiate an entire set of troubleshooting operations instead of just accessing the memory in which results of previously run tests are already stored. As mentioned above, the precise set of troubleshooting operations requested will vary according to what is prompting the troubleshooting request.

In a preferred embodiment, the signals which activate the troubleshooting program and which transmit the results of the troubleshooting are MA-UUI signals. After the troubleshooting program has completed its assigned tasks, such as performing a self-test of the software and hardware of the digital phone, the UUI program in the digital phone sends back signals to the diagnostic device which contain the data of the troubleshooting results, as shown in step 54. Once the troubleshooting data is received, the CPU is utilized to determine performance characteristics of the digital phone, as shown in step 56. After the performance characteristics have been determined, a decision is made as to whether a second round of troubleshooting is necessary, as shown in step 58. As mentioned above, the decision of whether a second round of troubleshooting is necessary can be made either by the CPU 24, a personal computer, or a technician. If a second round is necessary, then steps 52 through 56 are repeated. If a second round is not necessary, then the necessary repairs, if any, are performed on the digital phone as shown in step 60. This method can be used not only to troubleshoot phones which have already been determined to be malfunctioning, but also to perform regularly scheduled diagnostic checkups on phones for which no malfunctions have been reported. In this manner, any problems which might arise can be corrected, sometimes even before the customer has had an opportunity to discover them.

Figure 3:
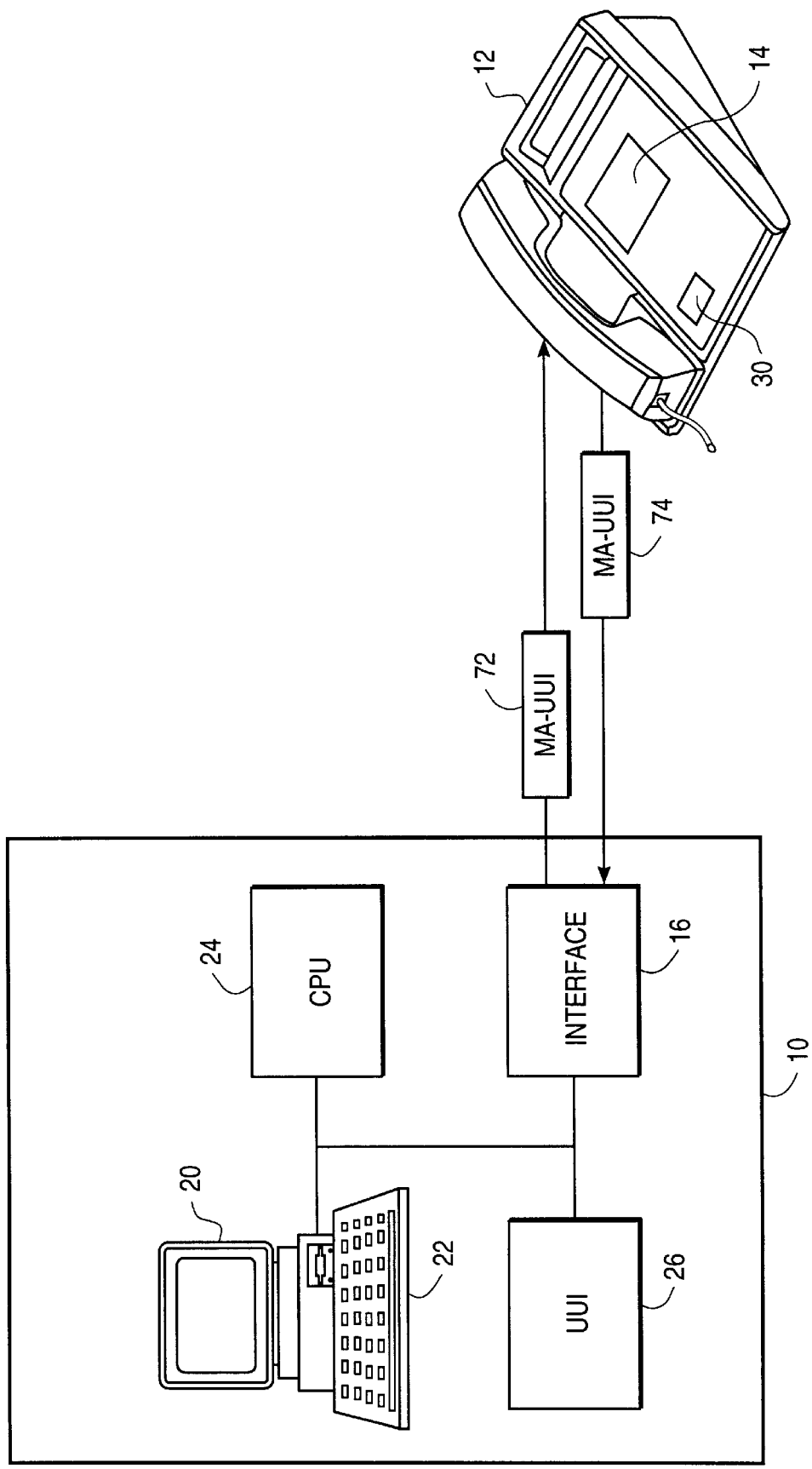
FIG. 3 is a block diagram of a device in FIG. 1 for performing remote diagnostic procedures on ISDN phones.

FIG. 3 illustrates the operation of the same system for performing remote diagnostic testing of digital phones as shown in FIG. 1, however in greater detail. According to the preferred embodiment of the invention, the signals transmitted from the UUI program 24 are message associated user-to-user information signals. The first MA-UUI signal 72, which contains code to activate the troubleshooting program 14, is transmitted on the D-channel of an ISDN line together with a SETUP signal. The MA-UUI contains within it a header which identifies the IMA-UUI to the digital phone as a request for troubleshooting data. This header also contains information which causes the digital phone to reject the B-channel call associated with the SETUP message on the D-channel. The troubleshooting program either performs a self-test or accesses the phone's memory 30 to obtain data of the error list and the self-test. The specific troubleshooting operations requested in the self-test or the specific self-test results requested from the memory 30 will depend on the context of the troubleshooting, as previously discussed. The RELEASE or DISCONNECT signal which is sent back to indicate that the associated B-channel call has been refused is accompanied by another MA-UUI 74, this one containing the troubleshooting data. Because both of the signals which activate the troubleshooting program and the signals which carry the troubleshooting results are transmitted on the D-channel, the digital phone can be in an on-hook or off-hook state while the troubleshooting is carried out.

The diagnostic device and system herein disclosed provides a more efficient method for troubleshooting remotely located digital feature phones than the prior art. There is no need for a service technician to travel to the site of a digital feature phone to perform troubleshooting. Both time and money are saved by avoiding dispatch of service personnel, especially if the service provider is located some distance from the feature phone site. The subscriber need not be disturbed by having the subscriber walk through troubleshooting procedures and report the results. Furthermore, employing the D-channel for transmitting the troubleshooting requests to the digital phone and for transmitting the results back to the diagnostic device provide two additional advantages. ID-channel calls are not charged, and since no B-channel connection is established, neither the party sending the request for troubleshooting in the form of a MA-UUI nor the user of the phone under test is charged for the call. Additionally, the B-channel carries user data such as voice information, and activity on D-channel is transparent to the subscriber. Therefore, since the entire troubleshooting procedure is performed on the D-channel and no B-channel connection is ever established, the customer is able to use the phone while the troubleshooting procedure is being executed.

While FIGS. 1 and 3 show the remote diagnostic device as being implemented in an ISDN environment, this is not critical since other communication techniques that allow troubleshooting activation messages and troubleshooting data messages to be carried along a signaling channel that is separate from the user data channel, or channels, may be employed in the manner described above. FIGS. 1, 2 and 3 all refer to troubleshooting digital phones. However, the troubleshooting method and system may be practiced on any ISDN feature phone including, but not limited to, a digital fax or a personal computer, without deviating from the claimed invention.

What is claimed is:

1. A device for performing troubleshooting on remote digital feature phones on a digital communications network without interrupting network service comprising:

first means associated with a digital telecommunications network for establishing bi-directional communicative contact via a publicly accessible digital line with a remote digital feature phone having a program with diagnostic protocol capable of being remotely activated; and second means, connected to said first means, for activating said program of said remote digital feature phone, said second means being configured to output a signal which accesses said program while said digital feature phone is in each of an on-hook and an off-hook state, said program being responsive to said second means to initiate specified troubleshooting procedures and to relay results of said troubleshooting procedures to said first means.

2. The device of claim 1 wherein said digital communications network with which said first means is associated is an ISDN.

3. The device of claim 1 wherein said specified troubleshooting procedures, activated by said second means, include generating an error list, said error list constituting data of each malfunction of said digital feature phone during its operation.

4. The device of claim 1 wherein said specified troubleshooting procedures, activated by said second means, include a self-test of hardware and software of said digital feature phone.

5. The device of claim 2 wherein said second means utilizes message associated user-to-user information (MA-UUI) to activate said program.

6. A method for performing remote diagnostic testing on digital feature phones on an ISDN without interrupting network service comprising the steps of:

connecting remote first and second sites via an ISDN line within an ISDN, with a diagnostic device located at said first site and a digital feature phone located at said second site, said digital feature phone including a program with diagnostic protocol;

transmitting a first set of signals from said diagnostic device to said digital feature phone via said ISDN line, said first set of signals activating said program with said diagnostic protocol and specifying particular troubleshooting functions for said program to perform while said digital feature phone is in each of an on-hook and an off-hook state;

receiving a second set of signals at said diagnostic device which contain results of performance of said troubleshooting functions from said digital feature phone via said ISDN line to said diagnostic device; and ascertaining performance characteristics relating to said digital feature phone based upon said troubleshooting results received in said second set of signals transmitted to said diagnostic device.

7. The method of claim 6 wherein said step of transmitting said first set of signals includes transmitting message associated user-to user information (MA-UUI).

8. The method of claim 7 wherein said step of transmitting said first set of signals includes transmitting MA-UUI with a header causing said digital feature phone to refuse an associated B-channel call.

9. The method of claim 7 wherein said step of receiving said second set of signals containing said results from performance of said troubleshooting includes receiving MA-UUI.

10. The method of claim 5 wherein said remote diagnostic device is located in one of a central office, a private branch exchange (PBX), a personal computer, and a digital feature phone.

11. The method of claim 5 further comprising the step of determining the necessity of a second round of troubleshooting based upon said performance characteristics and repeating said transmitting, receiving and ascertaining steps if it is determined that said second round of troubleshooting is necessary.

12. The method of claim 5 wherein said receiving step includes receiving said results of said troubleshooting functions, said troubleshooting functions including generating an error list and performing a self-test of hardware and software of said feature phone.

13. A system for performing diagnostic procedures on remotely located ISDN phones on an ISDN without interrupting service comprising:

a plurality of remotely located ISDN phones, each having a capability of executing a diagnostic protocol in response to remote activation, said diagnostic protocol being rules for implementation of a set of troubleshooting operations;

a remote diagnostic device having an interface to an ISDN supporting said ISDN phones, said interface providing a plurality of B-channels for exchanging user data and a D-channel, said remote diagnostic device being connected via a bi-directional transmission link of said ISDN to a selected one of said ISDN phones;

a program in said remote diagnostic device enabled for transmitting UUI code via said D-channel to said selected ISDN phone, said UUI code including data to trigger remote activation of said diagnostic protocol at said selected ISDN phone; and downloading means responsive to said UUI code transmitted from said remote diagnostic device within each of said ISDN phones for automatically relaying results of said troubleshooting operations in the form of UUI code via said D-channel to said remote diagnostic device.

14. The system of claim 13 wherein said first program includes at least one of a self-test and an error list.

15. The system of claim 13 wherein said remote diagnostic device possesses a diagnostic capability to interpret results of said troubleshooting operations, said interpretation forming the basis for a second set of signals sent by said program instructing said diagnostic protocol to carry out a second set of troubleshooting operations and to relay results of said second set of troubleshooting operations to said remote diagnostic device.

16. The system of claim 13 further comprising memory in which at least one of an error list and the results of a self-test are stored, said error list including any malfunctions which said digital feature phone has committed, said memory being accessible to said remote diagnostic device.

17. The system of claim 13 wherein said program is enabled for transmitting MA-UUI via said D-channel, said MA-UUI including information identifying said MA-UUI as a request for a set of troubleshooting operations, said header also including data instructing said ISDN phone to reject an associated B-channel call.

18. The system of claim 13 wherein said downloading means relays results of said troubleshooting operations in the form of MA-UUI via said D-channel, said MA-UUI being associated with a DISCONNECT or RELEASE message.

* * * * *